United States Patent
Blanco et al.

(10) Patent No.: US 7,249,548 B2
(45) Date of Patent: Jul. 31, 2007

(54) APPARATUS FOR CUTTING CORRUGATED METAL SHEET

(75) Inventors: Richard D. Blanco, Stratford, OK (US); Scott D. Pardue, Ada, OK (US)

(73) Assignee: Core Tech Tools, Inc., Stratford, OK (US)

( * ) Notice: Subject to any disclaimer, the term of this patent is extended or adjusted under 35 U.S.C. 154(b) by 0 days.

(21) Appl. No.: 10/939,905

(22) Filed: Sep. 13, 2004

(65) Prior Publication Data

US 2006/0053995 A1 Mar. 16, 2006

(51) Int. Cl.
*B27B 5/18* (2006.01)
*B27B 9/04* (2006.01)

(52) U.S. Cl. .............. 83/455; 83/139; 83/454; 83/458; 83/465; 83/466.1; 83/547; 83/471.3; 83/574; 269/97; 269/266; 269/274; 269/275

(58) Field of Classification Search .......... 83/547, 83/574, 455, 614, 139, 167, 454, 458, 465, 83/466.1, 941, 471.3; 269/56, 57, 77, 97, 269/216, 266, 274, 275; 206/521.2, 523, 206/349, 379
See application file for complete search history.

(56) References Cited

U.S. PATENT DOCUMENTS

| | | | |
|---|---|---|---|
| 1,457,492 A | | 6/1923 | Bloodgood |
| 1,663,486 A | | 3/1928 | Wertz |
| 1,782,615 A | * | 11/1930 | Hopwood .................. 269/98 |
| 2,311,042 A | * | 2/1943 | Ferguson .................. 269/98 |
| 2,519,107 A | * | 8/1950 | Brown ...................... 269/275 |
| 2,581,766 A | | 1/1952 | McConnell |
| 2,589,554 A | | 3/1952 | Killian |
| 2,595,322 A | * | 5/1952 | Avery ...................... 83/574 |
| 2,766,649 A | * | 10/1956 | Labry, Jr. ................ 81/185.1 |
| 2,803,271 A | * | 8/1957 | Shaw ....................... 83/468.3 |
| 2,941,554 A | * | 6/1960 | Long ....................... 83/574 |
| 3,044,507 A | | 7/1962 | Esposito |

(Continued)

FOREIGN PATENT DOCUMENTS

GB 2223976 * 4/1990

OTHER PUBLICATIONS

Health and Safety Executive, Control of noise at metal-cutting saws, HSE Engineering Information Sheet No. 27, Apr. 1998, HSE Books, Sudbury, Suffolk CO10 6FS.

*Primary Examiner*—Boyer D. Ashley
*Assistant Examiner*—Edward Landrum
(74) *Attorney, Agent, or Firm*—Dunlap Codding & Rogers, P.C.

(57) ABSTRACT

An apparatus for cutting a corrugated metal sheet is disclosed. The apparatus includes a table, a clamp assembly, and a cutting tool. The clamp assembly has a lower frame and an upper frame. A lower vibration absorbing pad is supported by the lower frame, and an upper vibration absorbing pad is secured to the upper frame such that the upper vibration absorbing pad faces the lower vibration absorbing pad. In an open position the lower and upper vibration absorbing pads are separated to permit the corrugated sheet metal to be positioned therebetween and in a closed position the corrugated metal sheet is clamped between the lower and upper vibration absorbing pads with at least one of the lower and upper vibration absorbing pads substantially conforming to the contour of an adjacent surface of the corrugated metal sheet.

21 Claims, 5 Drawing Sheets

U.S. PATENT DOCUMENTS

| | | | |
|---|---|---|---|
| 3,237,497 A * | 3/1966 | Cook | 83/387 |
| 3,373,781 A * | 3/1968 | Grosswald | 83/745 |
| 3,592,461 A * | 7/1971 | Lauriti | 426/312 |
| 4,088,312 A * | 5/1978 | Frosch et al. | 269/21 |
| 4,239,199 A * | 12/1980 | Miura | 269/266 |
| 4,291,602 A * | 9/1981 | Fast et al. | 83/745 |
| 4,557,684 A | 12/1985 | Romine et al. | |
| 5,088,181 A | 2/1992 | Jeppsson | |
| 5,322,001 A * | 6/1994 | Boda | 83/485 |
| 5,555,785 A * | 9/1996 | Scalise et al. | 83/589 |
| 5,971,378 A * | 10/1999 | Sweeney | 269/6 |
| 6,412,181 B1 | 7/2002 | Pracas | |
| 2004/0163520 A1* | 8/2004 | Nurenberg et al. | 83/471.3 |
| 2006/0236829 A1* | 10/2006 | Spain, III | 83/13 |

* cited by examiner

APPARATUS FOR CUTTING CORRUGATED METAL SHEET

BACKGROUND OF THE INVENTION

1. Field of the Invention

The present invention relates generally to an apparatus for cutting sheet material, and more particularly but not by way of limitation, to an apparatus for cutting a corrugated metal sheet.

2. Brief Description of Related Art

Corrugated or ribbed sheet metal is used in the construction industry for siding and roofing. During installation of this material, installers must occasionally cut the sheet material to size by making angled cuts or cross cuts. The current methods used to make these cuts include the use of hand cutters, such as snips, shears, and nibblers. The problem encountered with the use of such tools is that an unclean or unsightly cut with jagged edges and sharp burrs is produced. Furthermore, the use of these tools is typically time consuming, noisy due to vibration of the sheet material as it is being cut, and dangerous because the installers hands and arms are positioned at or near the jagged edges of the sheet material.

Other methods of making the necessary cuts include the use of metal-cutting circular saws. However, because corrugated metal sheets are pliable to a certain degree, the use of such saws is also noisy due to the vibration of the sheet material created by the saw and the noise associated with the saw itself. Furthermore, the pliability, and thus vibration, of the sheet material tends to cause circular saw blades to "kick off" the corrugated material. Plasma cutters are also utilized. However, these type of cutters require a controlled work environment and are expensive and burn off painted surfaces thereby voiding paint warranties.

To this end, a need exists for an apparatus that enables a corrugated metal sheet to be quickly and safely cut at a point of installation in a manner that results in a smooth edge. It is to such an improved apparatus that the present invention is directed.

DETAILED DESCRIPTION OF THE INVENTION

Figure 1:
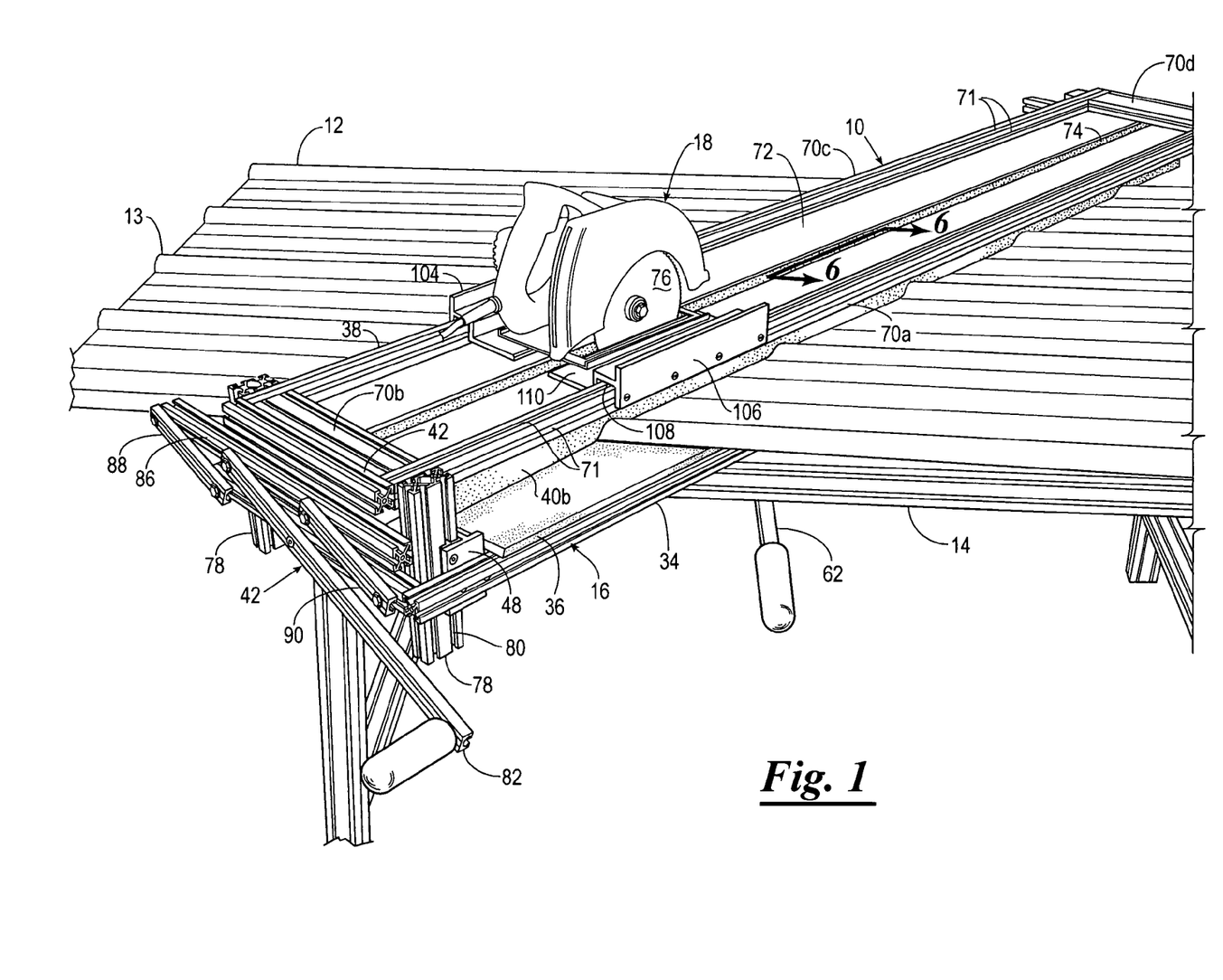
FIG. 1 is a perspective view of an apparatus for cutting a corrugated metal sheet constructed in accordance with the present invention shown in a closed position and holding a corrugated metal sheet.
Figure 2:
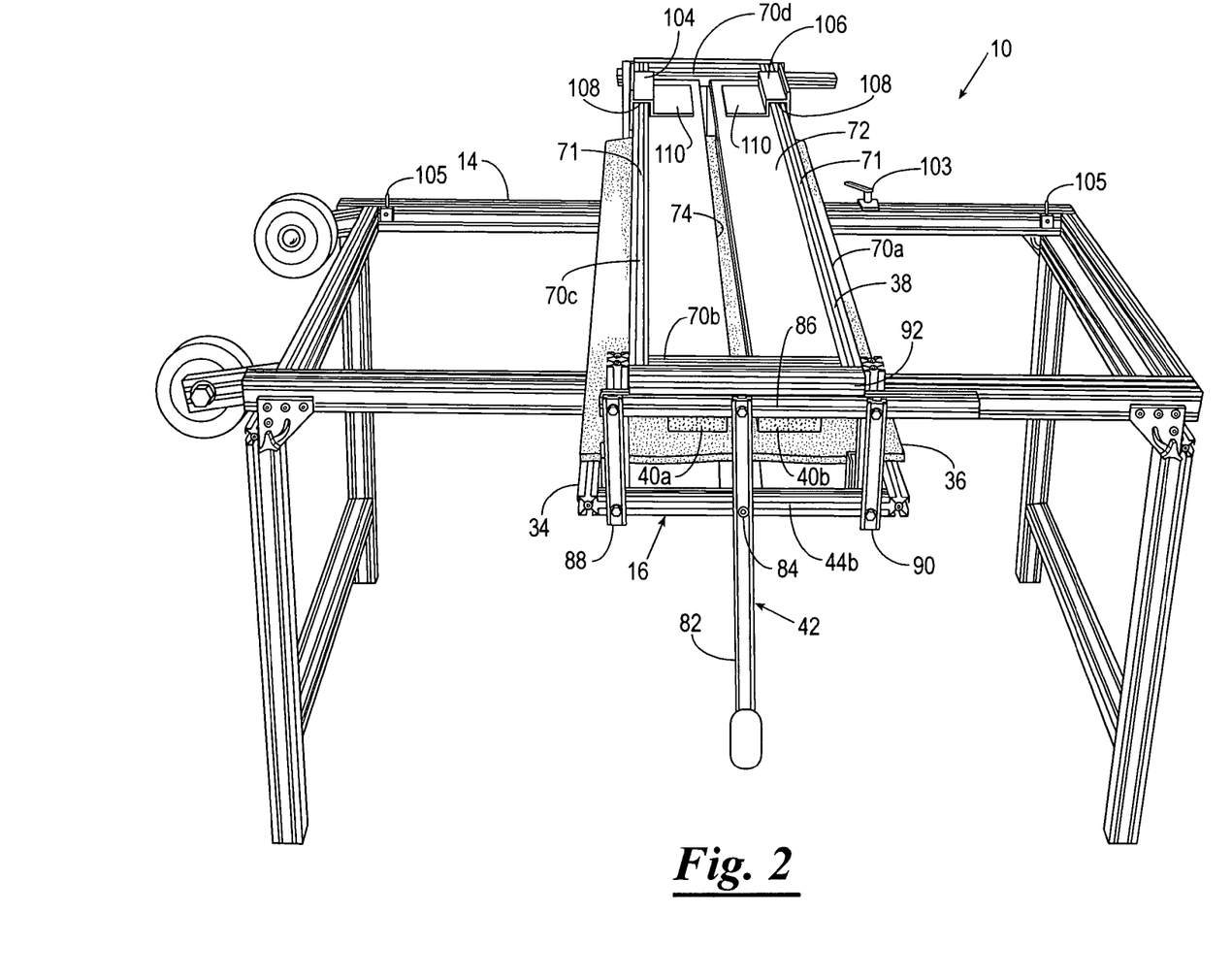
FIG. 2 is a perspective view of the apparatus of FIG. 1 shown in an open position.
Figure 3:
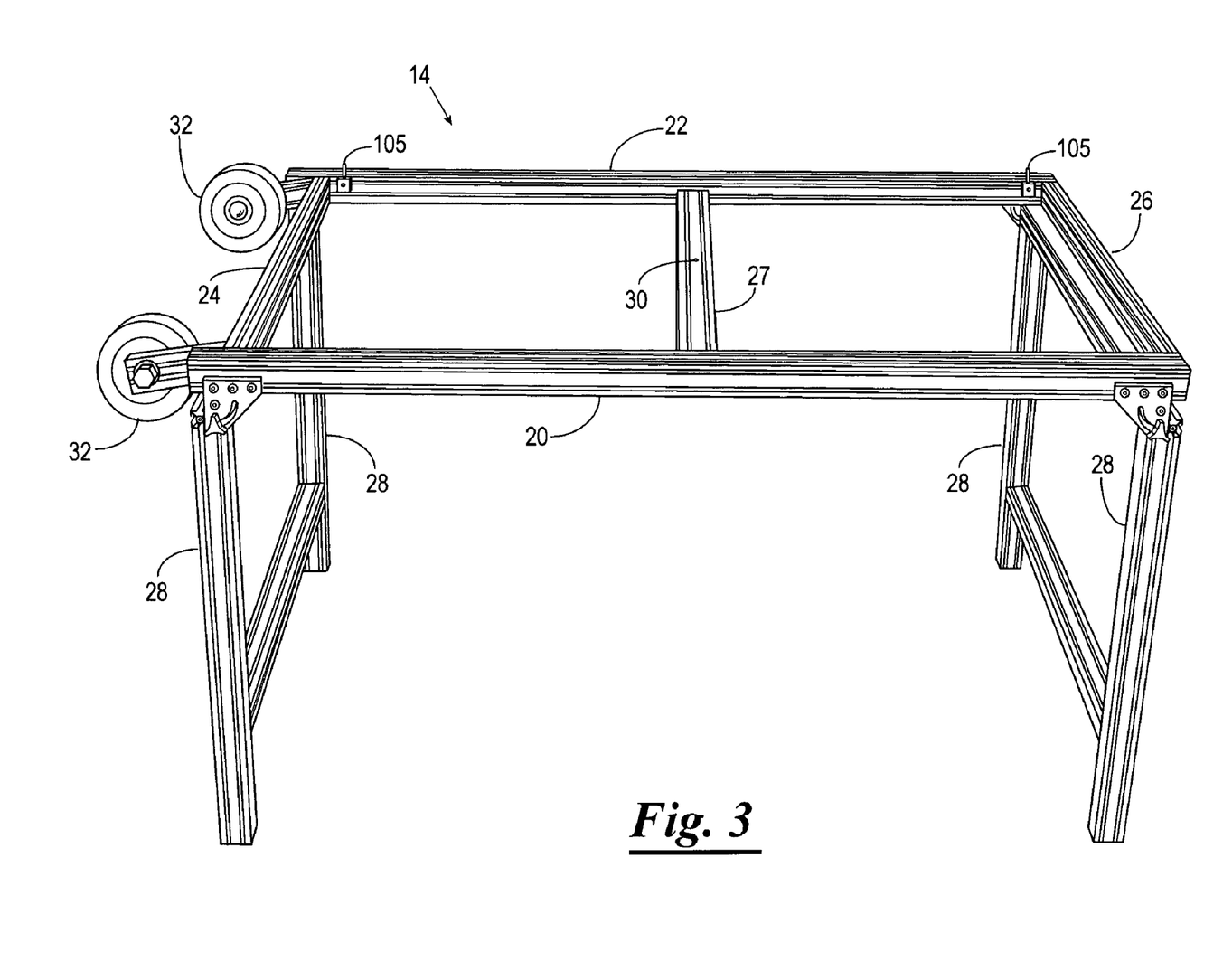
FIG. 3 is a perspective view of a table of the present invention.

Referring now to the drawings, and more particularly to FIGS. 1-3, shown therein is an apparatus 10 constructed in accordance with the present invention for cutting a metal sheet 12 (FIG. 1) having a plurality of corrugations 13. The apparatus 10 includes a table 14, a clamp assembly 16, and a cutting tool 18 (FIG. 1). The table 14 supports the corrugated metal sheet 12 and the clamp assembly 16. The clamp assembly 16 is designed to hold the corrugated metal sheet 12 and absorb the vibration thereof as the corrugated metal sheet 12 is cut by the cutting tool 18 which is slidably mounted to the clamp assembly 16.

As best shown in FIG. 3, a table 14 has a pair of side rails 20 and 22, a pair of end rails 24 and 26, and a central cross rail 27. The side rails 20 and 22 are secured to the end rails 24 and 26 to form a rectangularly shaped structure having a length and a width. The side rails 20 and 22, the end rails 24 and 26, and a central cross rail 27 are supported by four vertical legs 28 which are preferably pivotally connected to the side rails 20 and 22 to facilitate transportation of the table 14 from one work site to another. The side rails 20 and 22, the end rails 24 and 26, the central cross rail 27, and the legs 28 may be formed from any rigid, and preferably lightweight material, such as aluminum.

As will be described below, the clamp assembly 16 is pivotally mounted to the central cross rail 27. To this end, the central cross rail 27 is provided with a central hole 30. In addition, a pair of rollers 32 are shown mounted to the end rail 24 such that at least a portion of the rollers 32 extend above the upper surface of the side rails 20 and 22 and the end rails 24 and 26 and are of substantially equal in height with the clamp assembly 16. The rollers 32 are provided to facilitate positioning of the corrugated metal sheet 12 within the clamp assembly 16 by rollingly supporting the corrugated metal sheet 12 and to cooperate with the clamp assembly 16 to support the corrugated metal sheet 12 during the cutting process.

Returning now to FIGS. 1 and 2, the clamp assembly 16 broadly includes a lower frame 34, a lower vibration absorbing pad 36 secured to the lower frame 34, an upper frame 38, a pair of upper vibration absorbing pads 40a and 40b secured to the upper frame 38, and a lift assembly 42 connected to the lower frame 34 and the upper frame 38 for moving the upper frame 38 between an open position and a closed position.

Figures 4, 5:
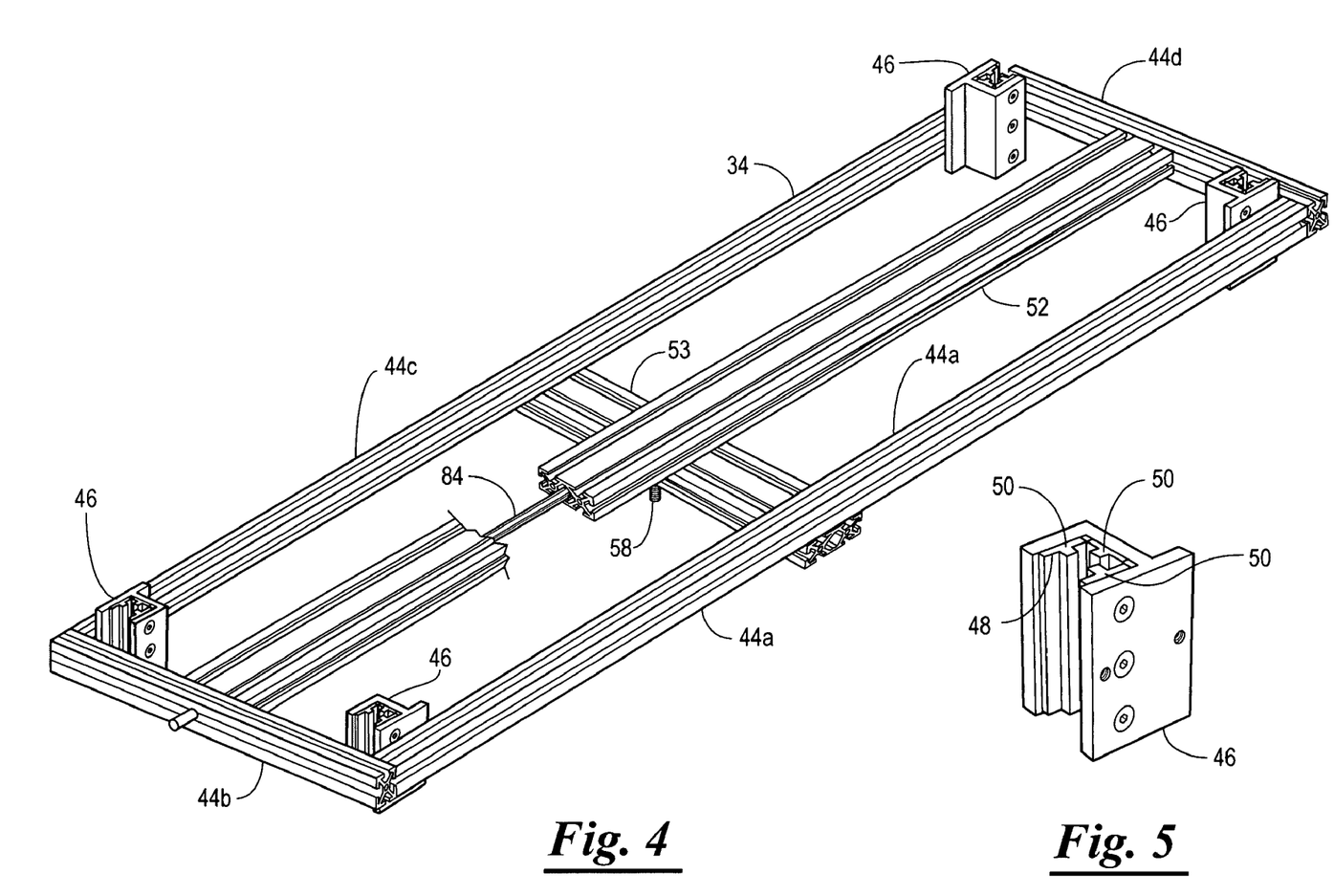
FIG. 4 is a cutaway, perspective view of a lower frame of a clamp assembly.
FIG. 5 is a perspective view of a guide member.

Referring now to FIG. 4, the lower frame 34 is constructed of a plurality of frame members 44a-44d secured to one another to form a rectangular structure having a length and a width. The length of the lower frame 34 should be such that the lower frame 34 traverses the width of the table 14, and preferably extends a distance beyond the width of the table 14 to permit the angular position of the clamp assembly 16 to be adjusted in a manner to be described below. The width of the lower frame 34 may be varied so long as the lower frame 34 is capable of providing adequate support to the corrugated metal sheet 12 during the cutting process.

The lower frame 34 is further provided with a plurality of guide members 46. As illustrated in FIGS. 4 and 5, the guide members 46 each have a generally U-shaped channel 48 and are secured to an inside surface of the frame members 44a and 44c toward the ends thereof. Guide inserts 50 are mounted within the U-shaped channels 48 of the guide members 46. The guide inserts 50 have a generally T-shaped configuration and are formed of a low friction material.

The lower frame 34 further includes a central frame member 52 extending along the length thereof and a cross member 53. The central frame member 52 cooperates with the frame members 44a-44d to support the lower vibration absorbing pad 36 and to house a portion of the lift assembly 42 in a manner to be described below. The cross member 53 has a bore 54 with a counter bore 56 through which a bolt 58 is extended so as to function as a pivot pin.

Figure 6:
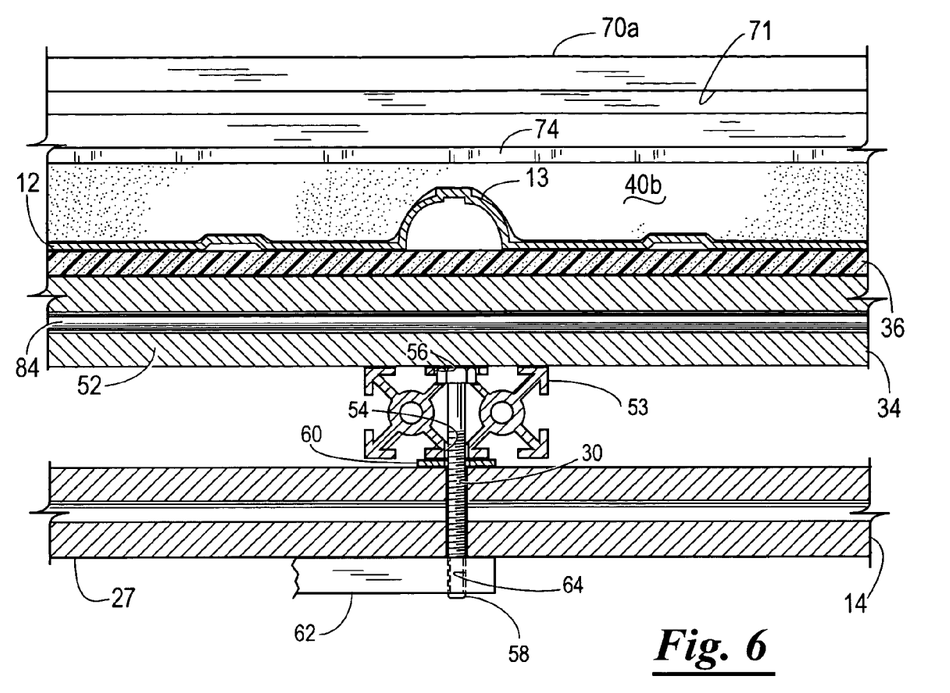
FIG. 6 is a cross-section taken along line 6-6 of FIG. 2.

As shown in FIG. 1, the clamp assembly 16 is mounted to the table 14 to permit the angular position of the clamp assembly 16 relative to the longitudinal axis of the table 14 to be selectively adjusted for the purpose of making cuts through the corrugated metal sheet 12 at different angles. In the embodiment shown herein, the lower frame 34 is positioned on the table 14 with the frame member 44a-44c resting on the side rails 20 and 22 of the table 14 and the bolt 58 inserted in the hole 30 of the table 14, as shown in FIG. 6. To reduce friction between the lower frame 34 and the table 14, a washer 60 formed of a low friction plastic material is disposed about the bolt 58 and positioned between the lower frame 34 and the table 14. Additionally, the frame members 44a-44d and the central frame member 52 of the lower frame 34 have inserts (not shown) fabricated of a low friction plastic secured to the lower sides thereof to facilitate sliding movement of the lower frame 34 over the table 14. To secure the lower frame 34 to the table 14 at a desired angle, a pivot brake 62 is secured to the distal end of the bolt 58. The pivot brake 62 is an elongated member with a threaded opening 64 (FIG. 6) for receiving the distal end of the bolt 58. To secure the position of the lower frame 34, the pivot brake 62 is moved in a counterclockwise direction from the perspective of an operator. Conversely, to release the lower frame 34, the pivot brake 62 is moved in a clockwise direction.

Figure 7:
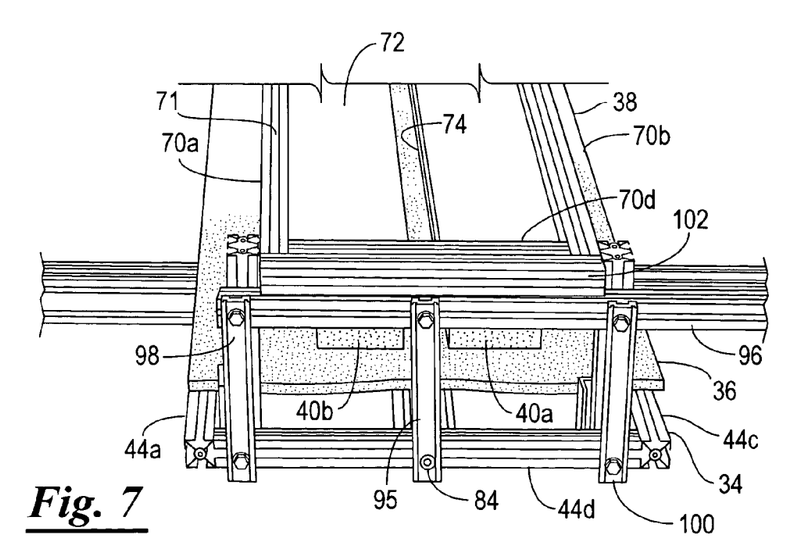
FIG. 7 is a perspective view of the apparatus of FIG. 2 showing the opposite end of the clamp assembly.

Referring now to FIGS. 1, 2, and 7, the upper frame 38 is positioned above the lower frame 34 and is movable relative to the lower frame 34 between an open position (FIGS. 2 and 7) and a closed position (FIG. 1). The upper frame 38 is constructed of a plurality of frame members 70a-70d secured to one another to form a rectangular structure having a length and a width. The frame members 70a and 70c include a plurality of longitudinal slots 71. The length of the upper frame 38 is substantially equal to the length of the lower frame 34, while the width of the upper frame 38 is shown to be less than the width of the lower frame 34. However, it will be appreciated that the width of the upper frame 38 may be varied relative to the lower frame 34.

A plate 72 is connected to the frame members 70a-70d to provide a surface to which the upper vibration absorbing pads 40a and 40b may be secured. The plate 72 has a slot 74 that extends along the length thereof and is sized to receive a cutting implement, such as a metal cutting blade 76, of the cutting tool 18.

The upper frame 38 is further provided with a plurality of vertical guide rails 78 (FIG. 1) adapted to be slidingly received in the U-shaped channel 48 of the guide members 46. The vertical guide rails 78 have one end connected to the outside surface of the frame members 70a and 70c and extend downwardly so as to be positionable within the guide members 46 whereby the upper frame 38 moves relative to the lower frame 34 such that the slot 74 of the plate 72 travels along a vertical plane as the upper frame 38 is moved between the open position and the closed position. The guide rails 78 have vertical slots 80 in which the guide inserts 50 of the guide members 46 are slidingly received to guide the vertical guide rails 78.

As shown in FIGS. 1, 2, and 7, the lower vibration absorbing pad 36 is secured to the lower frame 34, and the upper vibration absorbing pads 40a and 40b are secured to the upper frame 38 such that the upper vibration absorbing pads 40a and 40b face the lower vibration absorbing pad 36. In one embodiment, the lower vibration absorbing pad 36 is sized and dimensioned to extend substantially across the lower frame 34. The lower vibration absorbing pad 36 may be fabricated from any vibration dampening material, such as sponge rubber, or a covering filled with a gel, powder, or sand. Preferably, the lower vibration absorbing pad 36 has a sufficient hardness that allows the lower vibration absorbing pad 36 to support the corrugated metal 12 without the lower vibration absorbing pad 36 conforming to the contour of the corrugations 13 of the metal sheet 12, such as illustrated in FIG. 6. The lower vibrational absorbing pad 36 is secured to the lower frame 34 in any suitable manner, such as with an adhesive.

Similarly, the upper vibration absorbing pads 40a and 40b are secured to the underside of the plate 72 of the upper frame 38 in a suitable manner, such as with an adhesive. In the embodiment shown herein, the upper vibration absorbing pads 40a and 40b are secured to the plate 72 in a parallel relationship with the slot 74 of the plate 72 positioned therebetween. However, it will be appreciated that the upper vibration absorbing pad may also be constructed as a single piece provided with a slot for receiving the cutting blade 76 of the cutting tool 18.

The upper vibration absorbing pads 40a and 40b may be fabricated from any vibration dampening material, such as sponge rubber, or a covering filled with a gel, powder or sand. Preferably, the upper vibration absorbing pads 40a and 40b have a thickness and hardness that allows the upper vibration absorbing pads 40a and 40b to substantially conform to the contour of the corrugated metal sheet 12, as illustrated in FIG. 6. To this end, the upper vibration absorbing pads 40a and 40b should have a thickness greater than the height of the corrugations 13 of the metal sheet 12. For example, the thickness of the upper vibration absorbing pads 40a and 40b may be approximately 2-3 inches. It will be appreciated, however, that the lower vibration absorbing pad 36 and the upper vibration absorbing pads 40a and 40b may be interchanged with the thicker and softer pad positioned on the lower side and the firmer pad positioned on the upper side. Additionally, it may be desirable to use materials for the upper and lower vibration absorbing pads that will substantially conform to the contour of the corrugated metal sheet 12.

Referring now to FIGS. 1, 2, 4, and 7, the lift assembly 42 functions to move the upper frame 38 along with the upper vibration absorbing pads 40a and 40b and the cutting tool 18 from the closed position to the open position wherein the upper vibration absorbing pads 40a and 40b are separated from the lower vibration absorbing pad 36 to permit the corrugated metal sheet 12 to be positioned therebetween. The lift assembly 42 includes a handle 82 having an intermediate point fixed to one end of a rod 84 (FIG. 4) which extends through the frame member 44b, the central frame member 52, and the frame member 44d to the opposite side of the lower frame 34. The distal end of the handle 82 is pivotally connected to a slide rail 86. The slide rail 86 is additionally supported relative to the frame member 44b by a pair of struts 88 and 90 which are pivotally connected at each end to the frame member 44b and the slide rail 86. The slide rail 86 is positioned below a lift rail 92, which is secured to the end of the upper frame 38.

As shown in FIG. 7, the opposite end of the rod 84 is fixed to a lower end of a strut 95. The strut 95 is pivotally connected to a slide rail 96. The slide rail 96 is additionally supported relative to the frame member 44d by a pair of struts 98 and 100 which are pivotally connected to the frame member 44d and the slide rail 96. The slide rail 96 is positioned below a lift rail 102, which is secured to the end of the upper frame 38.

FIG. 1 shows the clamp assembly 16 in the closed position with the corrugated metal sheet 12 clamped between the lower vibration absorbing pad 36 and the upper vibration absorbing pads 40a and 40b. To move the clamp assembly 16 to the open position as shown in FIGS. 2 and 7, the handle 82 or the lift assembly 42 is rotated in a clockwise direction. Rotation of the handle 82 in turn causes the slide rails 86 and 96, which are connected to each other by the rod 84, to be moved upwardly into engagement with the lift rails 92 and 102, respectively. Additional rotation of the handle 82 causes the slide rails 86 and 96 to rotate about a pivot point defined by the rod 84 thereby causing the slide rails 86 and 96 to slide along the lift rails 92 and 102 and to exert an upward vertical force of the upper frame 38. The sliding engagement between the slide rails 86 and 96 and the lift rails 92 and 102 coupled with the vertical guide rails 78 positioned in the guide members 46 causes the upper frame 38 and the upper vibration absorbing pads 40a and 40b to move upwardly relative to the lower frame 34 such that the slot 74 of the upper frame 38 moves along a vertical plane.

In use, the clamp assembly 16 is rotated relative to the table 14 to a desired angle. To facilitate rotation to a desired angle, a protractor (not shown) may be mounted to the table 14 or the clamp assembly 16. Additionally, a stop member 103 (FIG. 2) may be adjustably mounted on the table 14 and positioned to engage the clamp assembly 16 upon the clamp assembly 16 being rotated to the desired angular position thereby preventing rotational movement of the clamp assembly 16 during the cutting process. The corrugated metal sheet 12 is then positioned between the lower vibration absorbing pad 36 and the upper vibration absorbing pads 40a and 40b so that the metal cutting blade 76 of the cutting tool 18 is aligned with a cut line along which a cut is desired to be made. A pair of guide pins 105 (FIGS. 2 & 3) are adjustably mounted to the table 14 to maintain the corrugated metal sheet 12 square relative to the table 14. The handle 82 is next rotated in a counterclockwise direction, thereby causing the upper frame 38 and the upper vibration absorbing pads 40a and 40b to move in a downward direction along a vertical plane until the upper vibration absorbing pads 40a and 40b rest on the corrugated metal sheet 12 with the upper vibration absorbing pads 40a and 40b extending along each side of the cut line and substantially conformed to contour to the adjacent surface of the corrugated metal sheet 12.

With the clamp assembly 16 angularly positioned relative to the table 14 at the desired angle and the corrugated metal sheet 12 clamped, the corrugated metal sheet 12 is ready to be cut with the cutting tool 18 (FIG. 1). The cutting tool 18 is shown to be a circular saw with the metal cutting blade 76. The cutting tool 18 is mounted to a pair of slide plates 104 and 106 mounted on each side of the slot 74 of the plate 72. Each slide plate 104 and 106 has a channel portion 108 and a plate portion 110. Guide inserts (not shown) are mounted within the channel portions 108. The guide inserts have a generally T-shaped configuration so as to be slidingly received in the slots 71 formed in the frame members 70a and 70c. The guide inserts are formed of a low friction plastic material to facilitate slidingly engagement between the slide plates 104 and 106 and the frame members 70a and 70c.

The cutting tool 18 is mounted to the plate portions 110 with the cutting blade 76 extending down through the slot 74. As such, upon effecting sliding movement of the cutting tool 18 longitudinally along the upper frame 38, the corrugated metal sheet 12 is cut while the lower vibration absorbing pad 36 and the upper vibration absorbing pads 40a and 40b cooperate to damp the vibration of the corrugated metal sheet 12 to allow a smooth cut to be effected through the corrugated metal sheet 12.

While the apparatus 10 of the present invention as been described for use in cutting corrugated metal sheets, it will be appreciated that the apparatus 10 may also be used to cut other types of products that may have a tendency to vibrate during the cutting process. In addition, it will be appreciated that other types of mechanisms may be utilized to move the clamp assembly 16 between the closed and opened positions, including pneumatic, hydraulic, or electrical devices.

Changes may be made in the combinations, operations and arrangements of the various parts and elements described herein without departing from the spirit and scope of the invention as defined in the following claims.

What is claimed:

1. An apparatus for supporting a corrugated metal sheet, comprising:
   a lower frame;
   a lower vibration absorbing pad supported by the lower frame;
   an upper frame positioned above the lower frame and the lower vibration absorbing pad, the upper frame movable relative to the lower frame between an open position and a closed position, the upper frame adapted to receive a cutting tool; and
   an upper vibration absorbing pad secured to the upper frame such that the upper vibration absorbing pad is in a face-to-face relationship with the lower vibration absorbing pad, in the open position the lower and upper vibration absorbing pads are separated to permit the corrugated sheet metal to be positioned therebetween and in the closed position the corrugated metal sheet is clamped between the lower and upper vibration absorbing pads with at least one of the lower and upper vibration absorbing pads substantially conforming to the contour of an adjacent surface of the corrugated metal sheet,
   wherein the upper frame and the upper vibration absorbing pad each has a longitudinal slot for receiving the cutting tool, and
   wherein the lower vibration absorbing pad is harder than the upper vibration absorbing pad.

2. The apparatus of claim 1 wherein the thickness of the upper vibration absorbing pad is greater than the thickness of the lower vibration absorbing pad.

3. The apparatus of claim 1 wherein the upper vibration absorbing pad is fabricated of a sponge rubber.

4. The apparatus of claim 1 wherein the lower vibration absorbing pad is fabricated of a sponge rubber.

5. The apparatus of claim 1 wherein the upper frame moves relative to the lower frame such that the longitudinal slots of the upper frame and the upper vibration absorbing pad move along a vertical plane.

6. An apparatus for supporting a corrugated metal sheet, comprising:
   a lower frame having a length and a width;
   a lower vibration absorbing pad supported by the lower frame;
   an upper frame having a length and a width and positioned above the lower frame and the lower vibration absorbing pad, the upper frame movable relative to the lower frame between an open position and a closed position, the upper frame adapted to receive a cutting tool;
   an upper vibration absorbing pad secured to the upper frame such that the upper vibration absorbing pad is in a face-to-face relationship with the lower vibration absorbing pad, in the open position the lower and upper vibration absorbing pads are separated to permit the corrugated sheet metal to be positioned therebetween and in the closed position the corrugated metal sheet is clamped between the lower and upper vibration absorbing pads with at least one of the lower and upper vibration absorbing pads substantially conforming to the contour of an adjacent surface of the corrugated metal sheet; and a table on which the corrugated metal sheet is supportable and on which the lower frame is mounted, the table having a length and a width and the lower frame mounted on the table such that the length of the lower frame traverses the width of the table, wherein the upper frame and the upper vibration absorbing pad each has a longitudinal slot for receiving the cutting tool.

7. The apparatus of claim 6 wherein the width of the lower frame is greater than the width of the upper frame.

8. The apparatus of claim 6 wherein the lower vibration absorbing pad substantially traverses the width the of the lower frame.

9. The apparatus of claim 6 wherein the length of the lower frame and the length of the upper frame are greater than the width of the table.

10. The apparatus of claim 6 wherein lower frame is pivotally mounted on the table.

11. An apparatus for cutting a corrugated metal sheet, comprising:

a lower frame;

a lower vibration absorbing pad supported by the lower frame;

an upper frame positioned above the lower frame and the lower vibration absorbing pad, the upper frame movable relative to the lower frame between an open position and a closed position;

an upper vibration absorbing pad secured to the upper frame such that the upper vibration absorbing pad is in a face-to-face relationship with the lower vibration absorbing pad, in the open position the lower and upper vibration absorbing pads are separated to permit the corrugated metal sheet to be positioned therebetween and in the closed position the corrugated metal sheet is clamped between the lower and upper vibration absorbing pads with at least one of the lower and upper vibration absorbing pads substantially conforming to the contour of an adjacent surface of the corrugated metal sheet; and a cutting tool slidably mounted on the upper frame and extending downwardly through and beyond the upper vibration absorbing pad for cutting the corrugated metal sheet as the corrugated metal sheet is clamped between the lower and upper vibration absorbing pads, wherein the lower vibration absorbing pad is harder than the upper vibration absorbing pad.

12. The apparatus of claim 11 wherein the thickness of the upper vibration absorbing pad is greater than the thickness of the lower vibration absorbing pad.

13. The apparatus of claim 11 wherein the upper vibration absorbing pad is fabricated of a sponge rubber.

14. The apparatus of claim 11 wherein the lower vibration absorbing pad is fabricated of a sponge rubber.

15. The apparatus of claim 11 wherein the upper frame and the upper vibration absorbing pad each has a longitudinal slot for receiving the cutting tool.

16. The apparatus of claim 15 wherein the upper frame moves relative to the lower frame such that the longitudinal slots of the upper frame and the upper vibration absorbing pad move along a vertical plane.

17. An apparatus for cutting a corrugated metal sheet, comprising:

a lower frame having a length and a width;

a lower vibration absorbing pad supported by the lower frame;

an upper frame having a length and a width and positioned above the lower frame and the lower vibration absorbing pad, the upper frame movable relative to the lower frame between an open position and a closed position;

an upper vibration absorbing pad secured to the upper frame such that the upper vibration absorbing pad is in a face-to-face relationship with the lower vibration absorbing pad, in the open position the lower and upper vibration absorbing pads are separated to permit the corrugated metal sheet to be positioned therebetween and in the closed position the corrugated metal sheet is clamped between the lower and upper vibration absorbing pads with at least one of the lower and upper vibration absorbing pads substantially conforming to the contour of an adjacent surface of the corrugated metal sheet;

a cutting tool slidably mounted on the upper frame and extending downwardly through and beyond the upper vibration absorbing pad for cutting the corrugated metal sheet as the corrugated metal sheet is clamped between the lower and upper vibration absorbing pads; and a table on which the corrugated metal sheet is supportable and on which the lower frame is mounted, the table having a length and a width and the lower frame mounted on the table such that the length of the lower frame traverses the width of the table.

18. The apparatus of claim 17 wherein the width of the lower frame is greater than the width of the upper frame.

19. The apparatus of claim 17 wherein the lower vibration absorbing pad substantially traverses the width the of the lower frame.

20. The apparatus of claim 17 wherein the length of the lower frame and the length of the upper frame are greater than the width of the table.

21. The apparatus of claim 17 wherein lower frame is pivotally mounted on the table.

* * * * *